United States Patent Office 3,708,495
Patented Jan. 2, 1973

3,708,495
1-CYCLOALKENYLMETHYL-4,5-DIHYDROXY-3-HYDROXYMETHYL-2-IMIDAZOLIDINONES
George W. Borden, Charleston, and David J. Trecker, South Charleston, W. Va., assignors to Union Carbide Corporation, New York, N.Y.
No Drawing. Filed Apr. 9, 1970, Ser. No. 27,144
Int. Cl. C07d 49/30
U.S. Cl. 260—309.7    3 Claims

ABSTRACT OF THE DISCLOSURE

Compounds represented by the formula:

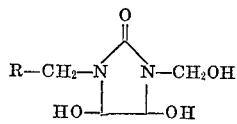

wherein R is cyclo-alkenyl or bicyclo-alkenyl containing 5 to 8 carbon atoms. The compounds have utility as durable press additives for textile fabrics.

---

The present invention relates to new compositions of matter and more particularly to 1-cycloalkenylmethyl-4,5-dihydroxy-3-hydroxymethyl-2-imidazolidinone and 1-bicycloalkenylmethyl-4,5-dihydroxy-3-hydroxymethyl-2-imidazolidinone which have utility as durable press additives for textile fabrics.

The new class of compounds may be represented by the structural formula:

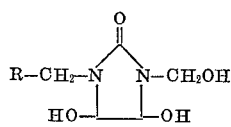

wherein R is cyclo-alkenyl or bicyclo-alkenyl containing 5 to 8 carbon atoms.

The R constituents of the above formula include, for example, 1-cyclopenten-2-yl, 1-cyclopenten-3-yl, 1-cyclohexen-2-yl, 1-cyclohexen-3-yl, 5-norbornen-2-yl, 1-bicyclo[2.2.2]-octen-6-yl, and the like.

Compounds contemplated by the above structural formula include the following:

1-(5-norbornen-2-ylmethyl)-4,5-dihydroxy-3-hydroxymethyl-2-imidazolidinone,
1-(1-cyclohexen-2-ylmethyl)-4,5-dihydroxy-3-hydroxymethyl-2-imidazolidinone,
1-(1-cyclohexen-3-ylmethyl)-4,5-dihydroxy-2-imidazolidinone,
1-(1-bicyclo[2.2.1]-octen-6-ylmethyl-4,5-dihydroxy-3-hydroxymethyl-2-imidazolidinone.

The novel compositions of the present invention may be prepared by conventional techniques utilizing reactions which are well known to the art. In a broad aspect, there is generally common to the synthesis of the novel compositions three basic reactions, i.e., (1) the condensation of ammonia with a suitable isocyanate, (2) the condensation of glyoxal with the resulting urea produced from (1) above, and (3) the condensation of formaldehyde with the resulting imidazolidinone produced from (2) above.

More specifically, the process for producing the novel compounds of the present invention may be represented by the following steps in which, merely as illustrative, 5-isocyanatomethyl-2-norbornene is employed as starting material and there is produced the novel compound 1-(5-norbornen-2-ylmethyl)-4,5-dihydroxy-3-hydroxymethyl-2-imidazolidinone.

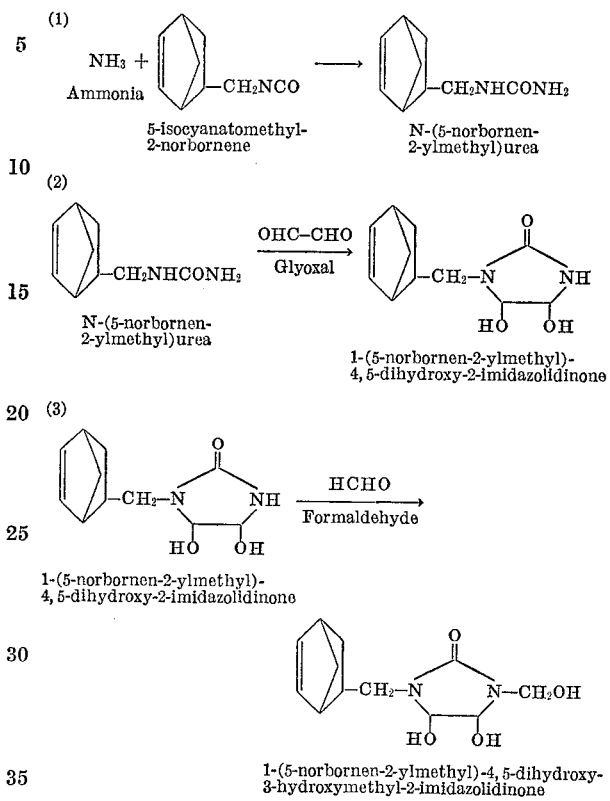

In a similar manner, other novel compounds falling within the generic structure can be produced, by employing the corresponding isocyanate. Thus, for example, 1-(1-cyclopenten-2-ylmethyl)-4,5-dihydroxy-3-hydroxymethyl-2-imidazolidinone is produced according to the above reactions when 3-isocyanato-methyl-1-cyclopentene is utilized as the starting material.

As will be seen from step 1 of the above general reaction scheme, the isocyanate is first reacted with ammonia in a condensation type reaction to produce the corresponding urea. The reaction is preferably conducted in the presence of a suitable solvent such as ethylbenzene, cumene, chlorobenzene and the like. Normally, the ammonia is introduced in gaseous form into an anhydrous solution of the isocyanate accompanied with stirring. The rate and amount of the ammonia charged into the system may range from 1 mole of ammonia/mole of isocyanate/second to 1 mole of ammonia/mole of isocyanate/hour. The preferred rate and amount is in the range from about 1 mole of ammonia/mole of isocyanate/minute to 1 mole of ammonia/mole of isocyanate/10 minutes.

Operating temperatures can extend over a relatively wide range such as from about —10° C. to the boiling point of the particular solvent utilized. However, it is preferred to conduct the reaction at ambient temperatures which eliminates the requirements for heating and/or cooling means. In practice, the ammonia is charged until no further precipitate forms and the resultant product is separated by conventional means such as by filtration, centrifuge and the like.

The separated product, i.e., the resultant urea from step 1 above is thereafter reacted with glyoxal in a second condensation type reaction. The manner of mixing the reactants (i.e., the resultant urea from step 1 above and glyoxal) is not critical and the reaction is preferably conducted in the presence of a solvent for both reactants. To the resultant solution there is added a catalytic amount of a base representative of which include sodium hydroxide, potassium hydroxide, calcium hydroxide, sodium carbonate, sodium methoxide, pyridine, potassium t-butoxide, triethylamine, and the like. The preferred basic catalysts are aqueous solutions of sodium or potassium hydroxide. In general, the molar ratio of urea compound to glyoxal can range from about 5:1 to 1:5 preferably within the range of about 1.5:1 to about 1:2 respectively. The molar ratio of base to glyoxal can range from about 1:10,000 to 1:10 preferably within a range of about 1:500 to about 1:100 respectively. The reaction mixture so formed is heated for a period of time to insure complete reaction. In general the reaction temperature at the time of mixing is maintained so as to prevent a strong exotherm. There are suitable conventional techniques known to the art for affecting this purpose and hence no detailed discussion of these techniques is deemed. Operating temperatures subsequent to the mixing of the reactants can be varied over a relatively wide range such as from about 30 to about 100° C. preferably about 50 to about 85° C. and most preferably from about 60 to about 80° C. Depending upon the reactants employed, the reaction time may vary from a few minutes to several days. Normally, however, the reaction is carried out for about 10 minutes to about 5 hours and preferably 30 minutes to about 2 hours. The reaction can be conducted under atmospheric pressure, although superatmospheric or subatmospheric pressures can be employed if desired.

The resultant product from step 2 above can be isolated by conventional techniques. In most instances, however, the product formed from step 2 can be reacted in situ. In step 3 the product from step 2 is subjected to conventional methylolation which is well known to those versed in the art.

In practice, the nitrogen containing compound formed from the conditions described above is not isolated, but is preferably treated in situ with aqueous formaldehyde (40%) to form the 3-methylol derivative. This methylolation reaction is a standard process, well known to those versed in the art. Generally, it involves treatment of the nitrogen-containing compound with a 0.5 to 10 mole equivalent of formaldehyde, most conveniently in 40% aqueous solution. In practice nearly equivalent molar amounts of formaldehyde and the nitrogen-containing compound are employed. It is advantageous to use a basic catalyst in order to facilitate the formaldehyde condensation. Any of the common water-soluble bases (sodium hydroxide, potassium hydroxide, sodium methoxide, calcium hydroxide, pyridine, etc.) can be employed. In practice, the base present from the preceding reaction with glyoxal is employed, without change, in the formaldehyde condensation. Hence, in practice, the formaldehyde solution is simply added to the reaction mixture and the resulting solution is heated to a temperature of about 40° C. to about 100° C., preferably to a temperature of about 60° C. to about 80° C. Reaction times may range from 10 minutes to 10 hours, although useful reaction times fall between about 30 minutes to about 3 hours. In practice, a reaction period of about 1 to about 2 hours is employed.

Under normal procedures, the 1-cycloalkenylmethyl-4,5-dihydroxy-3-hydroxymethyl-2-imidazolidine or 1-bicycloalkenylmethyl-4,5-dihydroxy - 3 - hydroxymethyl-2-imidazolidinone so formed is not isolated, or separated, but rather is directly utilized in the padding solution. To accomplish this, the solution is diluted to the desired percentage of organic (0.5 to 20% by weight; usually 5 to 10% by weight) with a solvent or solvent mixture that permits cosolution of all solutes. Water is preferred, but if solubility difficulties occur, methanol or aqueous methanol can be employed. Other materials may optionally be added to the pad bath. These include surfactants, emulsifiers, softeners, Lewis acid catalysts (e.g., magnesium or zinc salts), and other additives conventionally employed in textile treatments.

As mentioned previously the novel compounds have utility as durable press additives for textile fabrics. We have found that the reaction which takes place between the novel compositions described herein and the textile fabric involves a free-radical grafting reaction followed or preceded by an ionic etherification reaction, with the free-radical reaction site being the R radical as indicated in the structural formula of the novel compounds.

The textile fabrics which can be treated with the novel compounds of the present invention can be in the form of a woven or non-woven fabric composed of fibers such as those fabricated from cotton, cotton/polyester blends, cellulose acetate, rayon, wool, nylon 6, nylon 66, polyacrylonitrile, and the various derivatives and blends of the above. The treatment to impart durable press to the fabric is conventional and can be carried out in any of the following conventional sequences:

(a) Pad solution containing compound of the invention onto fabric, heat cure, irradiate, dry.
(b) Pad solution containing compound of the invention onto fabric, heat cure, rewet, irradiate.
(c) Pad solution containing compound of the invention onto fabric (with free radical source included, e.g., persulfate), heat cure only.
(d) Pad solution containing compound of the invention onto fabric, dry irradiate, heat cure.
(e) Pad solution containing compound of the invention onto fabric, irradiate wet, heat cure.
(f) Pad solution containing compound of the invention onto fabric, irradiate wet.
(g) Pad solution containing compound of the invention onto fabric, dry irradiate.

The novel compound is normally present in the textile fabric in amounts ranging from about 1 to 20 percent by weight based on the dry weight of the textile preferably 5 to 10 percent by weight. If the impregnated fabric is to be precured (a) and (b) or subjected to heat cure only (c), the composition of the pad bath is typically as follows:

8 parts of 1-cycloalkenylmethyl-4,5-dihydroxy-3-hydroxymethyl-2-imidazolidinone
2 parts magnesium chloride hexahydrate or other Lewis acid catalyst
1 part softener (optional)
Remainder distilled water If the material is to be preirradiated (d) and (e) or irradiated only (f) and (g), the pad bath usually does not contain the catalyst. This is applied following the irradiation in the case of (d) and (e) and is typically contained in a second pad, the composition of which is normally an aqueous solution of a surfactant and an acid or basic catalyst such as sodium bicarbonate or magnesium chloride or other known catalysts.

The heat curing, whether carried out before, after, or instead of irradiation, consists of holding the treated fabrics in a hot air oven at temperatures of about 100° to 500° F. (preferably 200 to 400° F.) for periods of 0 to 10 minutes (preferably 2 to 5 minutes; most preferably about 3 minutes).

Irradiation may be either particulate or non-particulate in nature. Particulate radiation includes α-particles (helium nuclei), generated from rare gas ion accelerators and β-ray (electrons) generated from electron accelerators (Van de Graaff, Dynamitron, Insulated Core Transformer, etc.). Non-particulate radiation includes γ-rays, generated from nuclear reactors and natural isotopes (cobalt 60, cesium-137, and the like), and ultraviolet and visible light (2000 to 8000 A.) generated from mercury, carbon, xenon, cadmium and crypton arcs, and similar sources. Preferred is electron irradiation. The electrons may be 0.1–3.0 mev. (million electron volts). Preferred are 0.1–2.0 mev. electrons; most preferred are 1.1–0.5 mev. electrons. Radiation doses may range from 0.01 to 20 megarads. Preferred are doses of 0.1–10 megarads. Most practical is the dose range of 0.5–2 megarads.

The fabrics treated in the manner described above are tested for improvement in wrinkle recovery by the conventional Monsanto Dry Wrinkle recovery procedure.

The following examples will illustrate the present invention.

EXAMPLE 1

1-(5-norbornen-2-ylmethyl)-4,5-dihydroxy-3-hydroxymethyl-2-imidazolidinone 5-isocyanatomethyl-2-norbornene (325.0 g. 1.5 moles) was dissolved in 4.1 of dry benzene. Dry ammonia was bubbled into the solution with stirring until a precipitate no longer formed. The product was filtered and dried in a vacuum oven at 40° C. and 1.5 mm.

*Analysis.*—Calculated for $C_9H_{14}N_2O$ (percent): C, 65.03; H, 8.49; N, 16.86. Found (percent): C, 65.06; H, 8.63; N, 16.72.

A mixture of the above (64 g.) and glyoxal (19 g. 50% solution) was warmed to 70° C. for 2 hours after adjusting the pH to 9. To the latter solution was added formaldehyde (28.5 g. 40% solution) and this was again heated for 2 hours at 70° C. To this was added 40 grams of a 50% aqueous solution of magnesium chloride and 0.8 g. of surfactant "Tergitol" 15-S-9 (a nine-mole ethoxylate of a linear secondary alcohol with an average of 15 carbon atoms, and which is manufactured by Union Carbide Corporation). The padding solution was prepared by diluting the above with 20% aqueous methanol to 800 g.

The above solution was applied to a 4 oz. 100% cotton broadcloth and squeezed to approximately 50% wet-pickup. These fabric samples were then treated by one of the following procedures:

(a) Dried at 150° F. for 5 minutes, irradiated-2 megarads, cured at 300° F. for 2 minutes.
(b) Dried at 150° F. for 5 minutes, rewet at 100% pick-up, irradiated-2 megarads, cured at 300° F. for 2 minutes.
(c) Dried at 150° F. for 5 minutes, cured at 300° F. for 2 minutes, irradiated-2 megarads.
(d) Same as (c) except sample was wet to 100% pickup before irradiating.

The following physical properties are noted in Table 1.

TABLE 1

| Reactant (fabric) | Reaction conditions | Percent applied | Crease recovery | Tear strength Warp | Tear strength Fill |
|---|---|---|---|---|---|
| 1-(5-norbornen-2-ylmethyl)-4,5-dihydroxy-2-hydroxymethyl-2-imidazolidinone (cotton) | A | 5.0 | 218 | 528 | 368 |
| Do | A | 5.0 | 213 | 448 | 352 |
| Do | B | 5.0 | 252 | 496 | 368 |
| Do | C | 5.0 | 231 | 560 | 400 |
| Do | D | 5.0 | 233 | 608 | 464 |
| None (cotton) | None | None | 162 | 1,008 | 928 |

Although certain preferred embodiments of the invention have been disclosed for purposes of illustration, it will be evident that various changes and modifications may be made therein without departing from the scope and spirit of the invention.

What is claimed is:

1. A compound represented by the formula:

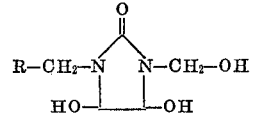

wherein R is cyclo-alkenyl of 5 to 8 carbon atoms or bicyclo-alkenyl of 7 carbon atoms.

2. 1-(5-norbornen-2-ylmethyl)-4,5-dihydroxy-3-hydroxymethyl-2-imidazolidinone.

3. 1-(1-cyclopenten-2-ylmethyl)-4,5-dihydroxy-3-hydroxymethyl-2-imidazolidinone.

References Cited

UNITED STATES PATENTS

| 2,731,364 | 1/1956 | Reibnitz et al. | 260—309.7 |
| 3,442,905 | 5/1969 | Herbes et al. | 260—309.7 |

FOREIGN PATENTS

| 1,535,271 | 6/1968 | France | 260—309.7 |
| 783,051 | 9/1957 | Great Britain | 260—309.7 |

OTHER REFERENCES

Chemical Abstracts, vol. 71, subject index, part 2, A–I, p. 1760S (1969) (published 1971).

NATALIE TROUSOF, Primary Examiner

U.S. Cl. X.R.

117—139.4; 252—8.8; 260—557 R, 557 B